United States Patent
Shukla

(10) Patent No.: US 11,553,522 B1
(45) Date of Patent: Jan. 10, 2023

(54) REDUCING MEDIUM ACCESS CONTENTION IN A WIRELESS MESH NETWORK

(71) Applicant: Amazon Technologies, Inc., Seattle, WA (US)

(72) Inventor: Ashish Kumar Shukla, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/076,733

(22) Filed: Oct. 21, 2020

(51) Int. Cl.
| | |
|---|---|
| H04W 74/08 | (2009.01) |
| H04W 74/00 | (2009.01) |
| H04W 72/12 | (2009.01) |
| H04W 76/11 | (2018.01) |
| H04W 72/04 | (2009.01) |
| H04W 84/12 | (2009.01) |

(52) U.S. Cl.
CPC ... *H04W 74/0808* (2013.01); *H04W 72/0446* (2013.01); *H04W 72/1263* (2013.01); *H04W 74/008* (2013.01); *H04W 76/11* (2018.02); H04W 84/12 (2013.01)

(58) Field of Classification Search
CPC ......... H04W 74/0808; H04W 72/0446; H04W 72/1263; H04W 74/008; H04W 76/11; H04W 84/12
See application file for complete search history.

(56) References Cited

U.S. PATENT DOCUMENTS

| | | | | |
|---|---|---|---|---|
| 2016/0219522 A1* | 7/2016 | Asterjadhi | ........ | H04W 28/0221 |
| 2016/0381704 A1* | 12/2016 | Chu | ................. | H04W 52/0216 370/329 |
| 2017/0019853 A1* | 1/2017 | Ghosh | ............... | H04W 52/0216 |
| 2019/0239226 A1* | 8/2019 | Chu | .................. | H04W 72/0453 |
| 2019/0246354 A1* | 8/2019 | Huang | .............. | H04W 52/0229 |

OTHER PUBLICATIONS

"Trigger frame format"; IEEE P802.11ax/D6.1; May 2020; pp. 118-131.
"Management Frames"; IEEE P802.11ax/D6.1; May 2020; pp. 132-139.
"Acknowledgment procedure for DL MU PPDU in MU format" IEEE P802.11ax/D6.6; May 2020; pp. 253-255.
"Target wake time (TWT)"; IEEE P802.11ax/D6.1; May 2020; pp. 288-290.

* cited by examiner

*Primary Examiner* — Chae S Lee
(74) *Attorney, Agent, or Firm* — Lowenstein Sandler LLP

(57) ABSTRACT

Technologies directed to reducing medium access contention within a wireless network are described. One method includes a first wireless device (e.g., an access point (AP) or mesh station) receiving first data with a first schedule from a second wireless device. Both wireless devices operate on a first channel or an adjacent channel in a wireless network. The first schedule defines a first interval during which the second wireless device transmits or receives frames on the first channel or the second channel. The first wireless device generates a second schedule that defines a second interval during which the first wireless device transmits or receives frames on the first or second channels, the second interval being non-overlapping with the first interval. First wireless device sends second data with the second schedule to the second AP device and communicates a data frame with a device connected to the first wireless device according to the second schedule.

20 Claims, 9 Drawing Sheets

US 11,553,522 B1

REDUCING MEDIUM ACCESS CONTENTION IN A WIRELESS MESH NETWORK

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

A wireless mesh network may support establishing point-to-point wireless links between the participating communication devices. A network device may utilize the wireless mesh network for accessing digital content stored on one or more digital content servers within or outside of the mesh network.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
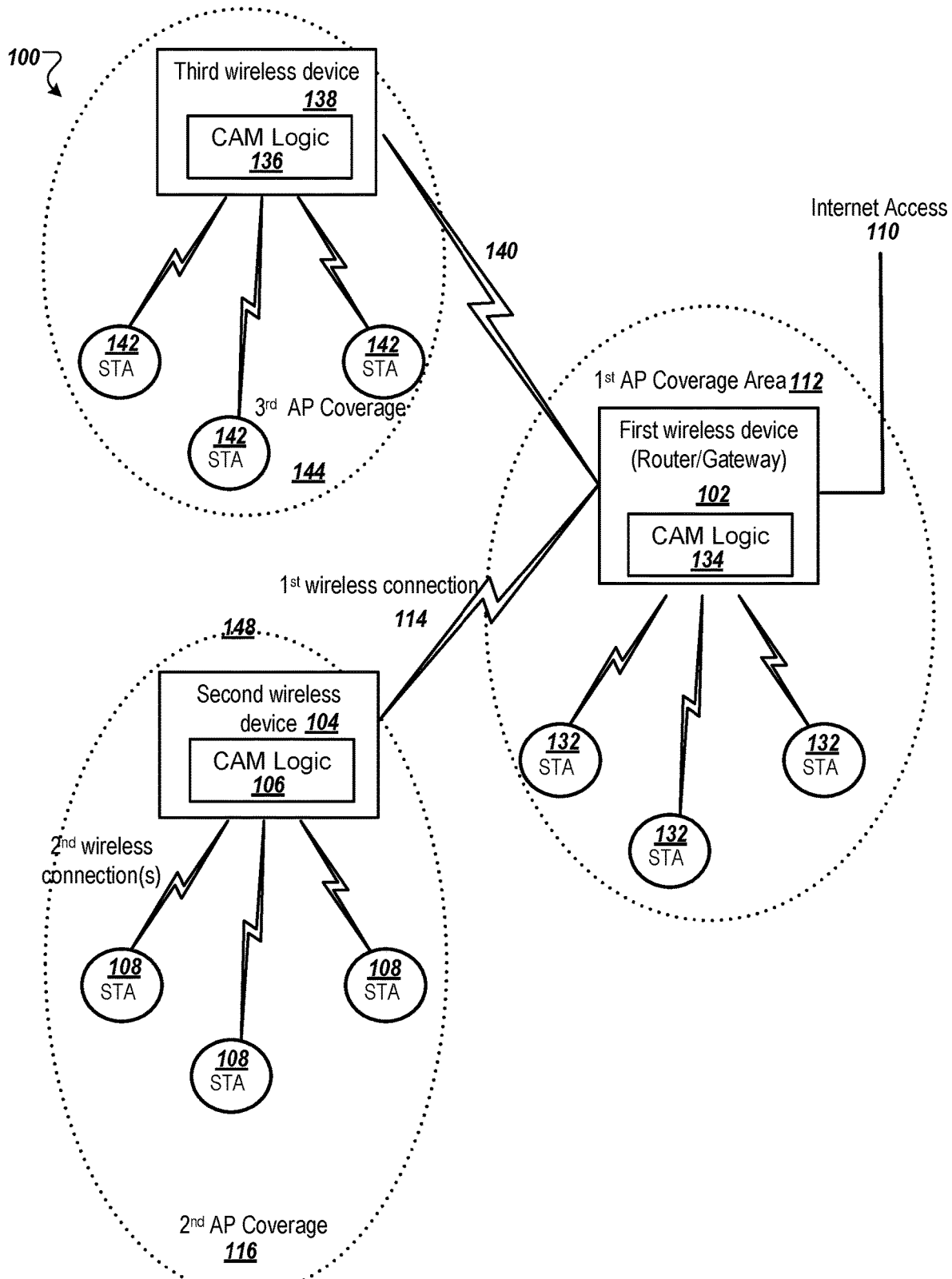
FIG. 1 is a network diagram of a wireless network with a first wireless device providing a first access point (AP) and internet access, a second wireless device with channel assessment mechanism (CAM) logic for providing a second AP with a non-overlapping periodic interval with the first AP according to one embodiment.

Technologies directed to reducing medium access contention within a wireless network are described. It is becoming more popular to use multiple access points (APs) in a wireless network, but these multiple APs may not be able to operate completely in different wireless channels. In many cases, multiple APs in a wireless network use a same wireless channel or adjacent wireless channels. In some frequency bands, adjacent channel interference is worse than when operating in a same channel. Currently, wireless devices can use a distributed channel access scheme, such as carrier-sense multiple access with collision avoidance (CSMA/CA), in which a node attempts to avoid collisions by beginning a transmission only after a channel is sensed to be "idle." Due to the nature of distribute channel access schemes (e.g., CSMA/CA), wireless devices may suffer severe medium access contention. In some cases, a wireless device can be aggressive for transmissions and can reduce an overall network capacity of the wireless network.

Aspects of the present disclosure address the above and other deficiencies of channel congestion by coordinating one or more schedules of non-overlapping periodic intervals in which each of a group of APs, which each operates on a same channel or an adjacent channel, performs frame exchanges with stations/devices connected to the respective AP. Aspects of the present disclosure can leverage an optional feature in IEEE 802.11ax, referred to as Time Wake Time (TWT), which was originally introduced to save device power by allowing a device to wake at a regular interval for short periods and sleep for the rest of the periods. Aspects of the present disclosure can allow each AP to advertise its TWT schedule and to adjust their TWT schedule to be non-overlapping, as well as to adjust contention parameters to give priority to the scheduled AP during the respective TWT schedule, thereby reducing channel access contention.

In at least one embodiment, channel assessment mechanism (CAM) logic can implement inter-AP scheduling of periodic intervals in which each of multiple APs can transmit or receive data frames to reduce contention. The CAM logic can be used for wireless local area network (WLAN) technologies (e.g., Wi-Fi® technology). Alternatively, CAM logic can be used for other wireless technologies, such as personal area network (PAN) technologies, or the like. In one embodiment, a first radio of a first wireless device can be used to connect the first wireless device to a second wireless device that operates as a first AP (e.g., a first AP, such a wireless router, gateway, or modem) for internet access, whereas a second radio of the first wireless device can be used to create a second AP and connect to one or more client devices, also referred to as stations (STAs). In some cases, both radios can operate in the same band concurrently and can use a good channel selection mechanism to avoid any coexistence issues. In other cases, the first radio can use a first frequency band, such as 5 GHz, and the second radio can use a second frequency band, such as 2.4 GHz. A first channel for either one of the radios is decided by a respective AP. As described above, there are cases where multiple APs in a wireless network operate on a same channel or on an adjacent channel. The CAM logic, which can be used for channel section for either radio, can be used for coordinating schedules of non-overlapping periodic intervals as described herein. In one embodiment, a first AP device receives first data from a second AP device, the first AP device and the second AP device being part of a wireless network and both operating on a first channel or a second channel that is adjacent to the first channel. The first data includes at least a first schedule that defines one or more periodic intervals during which one or more AP devices of the wireless network transmits or receives frames on the first channel or the second channel. The first AP device generates a second schedule that defines a second periodic interval during which the first AP device transmits or receives frames on the first channel or the second channel, where the second periodic interval and the one or more periodic intervals are non-overlapping periodic intervals. The first AP device sends second data to one or more APs devices, the second data including at least the second schedule. The first AP device communicates one or more data frames with one or more stations/devices according to the second schedule. It should be noted that although various embodiments described herein are directed to AP devices, in other embodiments, a wireless device can be a mesh station (STA), a wireless device with a soft AP, or another wireless device in which one or more devices are connected to it wirelessly for access and the other device can communicate with another device for access or backhaul connectivity.

FIG. 1 is a network diagram of a wireless network 100 with a first wireless device 102 providing a first access point (AP) and internet access, a second wireless device 104 with channel assessment mechanism (CAM) logic 106 for providing a second AP with a non-overlapping periodic interval with a periodic interval of the first AP according to one embodiment. In this embodiment, first wireless device 102 and second wireless device 102 operate in a same channel or adjacent channels. First wireless device 102 provide backhaul connectivity to wireless network 100, such as using a wired or wireless connection 110 to the Internet. For example, first wireless device 102 can be connected to a gateway or a modem via wired or wireless connection 110. Alternatively, first wireless device 102 can be a router or a gateway and can provide internet access to second wireless device 104 and third wireless device 138 described below. First wireless device 102 can provide a first AP to wireless devices, such as endpoint devices 132, in a first AP coverage area 112 on a first channel. One or more endpoint devices 132 can also be referred to as client devices or stations (STAs).

Second wireless device 104 can establish a first wireless connection 114 with first wireless device 102. Second wireless device 104 can provide a second AP to wireless devices, such as endpoint devices 108, in a second AP coverage area 116. Second wireless device 104 can establish one or more second wireless connections 118 with the one or more endpoint devices 108. One or more endpoint devices 108 can be a computer, a smart phone, a voice-controlled device, a wireless display, a wireless speaker, a game console, a wireless game pad, or the like. In some cases, a primary radio is used to connect second wireless device 104 to first wireless device 102, for internet access and a secondary radio is used to create a second AP for connecting endpoint devices 108. Both radios can operate in the same band or in separate bands. First wireless device 102 and second wireless device 104 can provide first AP and second AP, respectively, using a same channel or adjacent channels. To avoid contention by first wireless device 102 and second wireless device 102, CAM logic 106 can coordinate schedules for data exchanges to be non-overlapping as described in more detail below. As illustrated in FIG. 1, first wireless device 102 can include CAM logic 134 that can perform similar operations as CAM logic 106. In addition, illustrated in FIG. 1, first wireless device 102 can connect to other APs in wireless network 100, such as third wireless device 138, which can also include CAM logic 136. Third wireless device 138 can connect to first wireless device over a wireless connection 140 and can provide a third AP connect to one or more endpoint devices 142 within third AP coverage area 144. Third wireless device 138 can provide a third AP to wireless devices, such as endpoint devices 142, in a third AP coverage area 144. Alternatively, wireless network 100 can include more than first wireless device 102, second wireless device 104, and third wireless device 138.

In at least one embodiment, CAM logic 106 (134, 136) can leverage a Target Wake Time (TWT) feature, as set forth as an optional feature in IEEE 802.11ah. TWT allows devices in a single AP network to remain in an idle mode (e.g., a sleep mode) longer and, upon transitioning from idle mode to an active mode, perform frame exchanges with a single AP device at scheduled predefined TWT intervals. A TWT schedule defines periodic intervals, including a start time and an amount of time, in which a client device can wake up (i.e., transition from idle mode to active mode) and perform frame exchange with a single AP device. For example, TWT feature in IEEE 802.11ax allows an AP to define a periodic schedule to let downstream devices to perform exchange during scheduled times to save device power, allowing these devices to awake at regular intervals for short periods and sleep for the rest of the period outside of the TWT schedules. The TWT schedule can be dynamic and can be advertised in a beacon frame, an action frame, or the like. An IEEE 802.11ax-compatible device can perform frame exchanges in a TWT period upon receiving a trigger frame from an AP. Thus, an AP controls both uplink as well as downlink traffic during TWT periods.

Given client devices only perform exchange during their respective TWT schedule, this feature also reduces contention within multiple devices connected to a same AP when these devices wakeup to receive buffered traffic from the single AP. The TWT feature, as described in IEEE 802.11ah and 802.11ax is limited to one AP serving a set of connected devices. CAM logic 106 extends the TWT scheme to manage inter-AP channel access coordination for multiple APs in a wireless mesh network. APs that are part of the same wireless mesh network, such as first wireless device 102, second wireless device 104, and third wireless device 138, are grouped together using a common network identifier. CAM logic 106 (134, 136) can perform clock synchronization with respect to other APs, track traffic loads of APs, and maintain TWT schedules being broadcast by other APs nearby, for their wireless local area networks. By maintaining TWT schedules of other APs nearby, CAM logic 106 can schedule its TWT schedule such that its TWT schedule and other TWT schedules of other APs do not overlap, further reducing contention within the entire wireless network 100.

Wireless network 100 is an example mesh network topology that includes three APs operating in a same channel or adjacent channels and uses distributed TWT scheduling. All APs, implemented by first, second, and third wireless devices 102, 104, 138, can be IEEE 802.11ax+ capable and first wireless device 102 provides backhaul connectivity to the entire wireless network 100. Each of the APs in wireless network 100 track other APs' clocks using beacon frames (also referred to "beacons") being advertised by each of the other APs. For example, second wireless device 104 (via CAM logic 106) can receive a first beacon frame from first wireless device 102 and a second beacon frame from third wireless device 138. In at least one embodiment, the beacon frames can include a schedule of its respective periodic interval (TWT schedule) during which it performs frame exchange. In at least one embodiment, the beacon frame can include a timestamp, an offset from the timestamp, and a duration (e.g., amount of time) for its respective periodic interval (TWT schedule). An AP can generate or adjust its own periodic interval (TWT schedule) so that it does not overlap the periodic intervals already scheduled. An AP device can adjust their TWT schedule to avoid connected devices from performing a channel access outside of the schedule TWT schedule of the AP. An AP device can schedule endpoint devices, connected to the AP device, channel access during periods specified in the respective TWT schedule.

During operation, in at least one embodiment, second wireless device 104 establishes first wireless connection 114 with first wireless device 102 using a first radio (e.g., first WLAN radio), where the first wireless device 102 operates as a first AP on a first channel and provides Internet access. After first wireless connection 114 is established, second wireless device 104 enables a second AP on the first channel or an adjacent channel to the first channel using a second radio (e.g., second WLAN radio). Second wireless device 104 receives first data from the first wireless device 102 (e.g., first AP), the first data including, for example, a first schedule that defines a first interval during which the first wireless device 102 (e.g., first AP)_transmits or receives frames on the first channel. The first data can also include a timestamp indicative of a first clock at the first wireless device 102 (e.g., first AP). In one embodiment, the first interval is a reoccurring period and can be defined using a target beacon transmission time (TBTT) offset from a first clock at the first wireless device 102 (e.g., first AP). The TBTT offset and a timestamp can be used to determine a first clock for synchronizing a second clock at the second wireless device 104 (e.g., second AP) with the first clock. The first data can also define a duration or an amount of time of the first interval. The first schedule can also be considered a TWT schedule that indicates a start time and a time duration of each TWT period. As described herein, not only can this be used for power reduction by client devices, the TWT schedule can be used to reduce contention in wireless network 100. Second wireless device 104 synchronizes a second clock at the second wireless device 104 (e.g., second AP) with the first clock using the timestamp and generates, using the first schedule, a second schedule that defines a second interval with a second amount of time during which the second wireless device 104 (e.g., second AP) transmits or receives frames on the first channel, where the second interval and the first interval are non-overlapping intervals. Second wireless device 104 sends second data to the first wireless device 102 (e.g., first AP), the second data including the second schedule.

In a further embodiment, second wireless device 104 receives third data from a third AP implemented by third wireless device 138, the third data including a third schedule that defines a third periodic interval with a third amount of time during which the third AP transmits or receives frames on the first channel. The third data can also include a timestamp indicative of a third clock at the third AP device. Second wireless device 104 generates the second schedule using the first schedule and the third schedule. The third periodic interval, the second periodic interval, and the first periodic interval are non-overlapping periodic intervals. Second wireless device 104 sends the second schedule to the third AP. In another embodiment, second wireless device 104 schedules the second schedule using the first schedule and sends the second schedule to third wireless device 138. Third wireless device 138 can schedule a third schedule using the first schedule and the second schedule.

In at least one embodiment, the first data (and/or second data and/or third data) can include a common network identifier associated with a set of APs that are part of wireless network 100 and operating on the first channel or the adjacent channel. That is, in this embodiment, a common network identifier is associated with first wireless device 102, second wireless device 104, and third wireless device 138. Alternatively, a common network identifier is associated with other wireless devices in wireless network 100.

In at least one embodiment, at least one endpoint device 108 connected to the second wireless device 104 transitions from an idle state to an active state at a beginning of the second periodic interval. Second wireless device 104 adjusts a channel contention parameter to a first value at the beginning of the second periodic interval. The channel contention parameter being set to the first value prevents another device from taking over the first channel during the second periodic interval. Second wireless device 104 sends or receives frames to or from the at least one endpoint device 108 connected to the wireless device during the second periodic interval. Second wireless device 104 adjusts the channel contention parameter to a second value at an end of the second periodic interval, the second value being greater than the first value. The second value can be a default value that defines an amount of time used to avoid contention. For example, the first value can correspond to a duration that a device has to wait to gain access to a medium, such as Point Coordination Function Inter-frame space (PIFS), whereas the second value can correspond to a longer duration that a device has to wait to gain access to a medium, such as Distributed Coordination Function Inter-frame space (DIFS), which is used to prevent collisions. Since PIFS is less than DIFS, the first value can ensure priority to the AP participating in scheduling to avoid contentions.

In at least one embodiment, CAM logic 106 at second wireless device 104 receives first data from a first AP implemented by first wireless device 102, the first data including a first schedule. Second wireless device 104 implements a second AP. The first AP and the second AP are part of wireless network 100 and both operating on a first channel or a second channel that is adjacent to the first channel. The first schedule one or more periodic intervals during which one or more AP devices of wireless network 100 transmits or receives frames on the first channel or the second channel. CAM logic 106 generates a second schedule that defines a second periodic interval during which the first AP device transmits or receives frames on the first channel or the second channel. The second periodic interval and the one or more periodic intervals are non-overlapping periodic intervals. CAM logic 106 sends second data, including two schedule, to the one or more AP devices, the second data comprising the second schedule. In a further embodiment, CAM logic 106 receives time information, such as part of first data that includes the first schedule. CAM logic 106 synchronizes, using the time information, a clock of the first AP with a clock of the one or more AP devices. In a further embodiment, CAM logic 106 also receives third data from a third AP, implemented by third wireless device 138. The third data can include a third schedule that defines a third periodic interval with a third amount of time during which the third AP transmits or receives frames on the first channel or the second channel.

CAM logic 106 can generate the second schedule using the first schedule and the third schedule.

Figure 2:
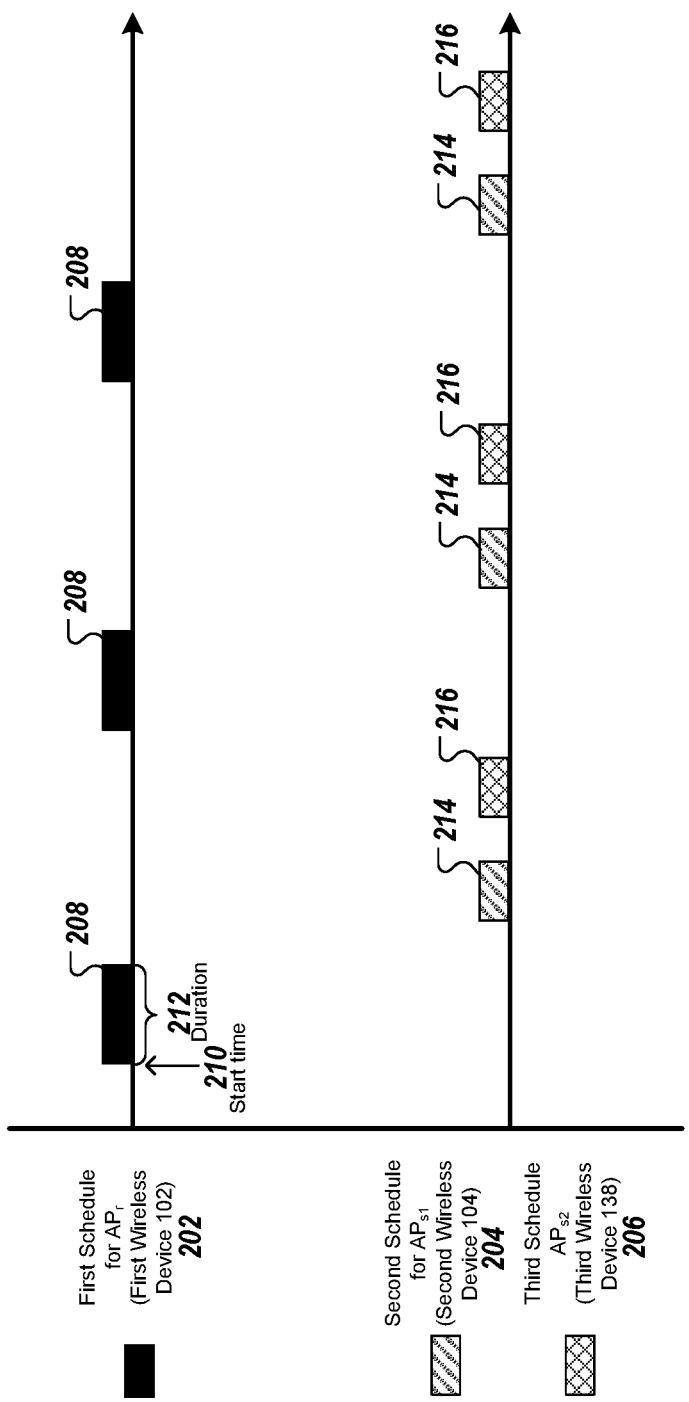
FIG. 2 illustrates a first schedule for a first wireless device, a second schedule for a second wireless device, and a third schedule for a third wireless device, according to at least one embodiment.

FIG. 2 illustrates a first schedule 202 for a first wireless device 102, a second schedule 204 for a second wireless device 104, and a third schedule 206 for a third wireless device 138, according to at least one embodiment. First schedule 202 defines one or more periodic intervals 208 during which the first wireless device 102 transmits or receives frames on a first channel or a second channel that is adjacent to the first channel. Each of the one or more periodic intervals 208 includes a start time 210, such as noted by a timestamp and an offset number specified in a beacon frame. A beacon frame can also specify a duration 212 of the one or more periodic intervals 208. Alternatively, first schedule 202 can be included in an action frame transmitted by the first wireless device 102. In another embodiment, a start time and an end time can be specified in a beacon frame. Alternatively, first schedule 202 can be included in an action frame transmitted by the first wireless device 102.

Second schedule 204 defines one or more periodic intervals 214 during which the second wireless device 104 transmits or receives frames on the first or second channels. Each of the one or more periodic intervals 214 includes a start time, such as noted by a timestamp and an offset number specified in a beacon frame, as well as a duration. Alternatively, second schedule 204 can include time information in the beacon or action frames received or transmitted by the second wireless device 104. In some cases, second schedule 204 is generated to be non-overlapping with the first schedule 202 based on the first schedule 202. In other cases, second schedule 204 is generated to be non-overlapping with the first schedule 202 and third schedule 206 based on the first schedule 202 and the third schedule 206. Alternatively, additional schedules can be considered when generating the second schedule 204. Third schedule 206 defines one or more periodic intervals 216 during which the third wireless device 138 transmits or receives frames on the first or second channels. Each of the one or more periodic intervals 216 includes a start time, such as noted by a timestamp and an offset number specified in a beacon frame, as well as a duration. Alternatively, third schedule 206 can include time information in the beacon or action frames received or transmitted by the third wireless device 138. In some cases, third schedule 206 is generated to be non-overlapping with the first schedule 202 based on the first schedule 202. In other cases, third schedule 206 is generated to be non-overlapping with the first schedule 202 and second schedule 204 based on the first schedule 202 and the second schedule 204. Alternatively, additional schedules can be considered when generating the third schedule 206.

As illustrated in FIG. 2, given that APs' schedule do not overlap with each other, channel access contention is reduced as devices part of one AP BSS only perform frame exchange in the respective schedule, which do not overlap with other APs' schedules.

Referring back to FIG. 1, in one embodiment, CAM logic 106 receives the first data and sends the second data on a third channel that is different than the first channel or the second channel. The first channel (and/or the second channel) can be considered a primary communication channel for frame exchanges and the third channel can be a secondary communication channel, such as a control channel, a power line communication (PLC) channel, a wired channel, or the like. The secondary communication channel can be a different channel than the first channel or the second channel that is used by the first AP and second AP for frame exchanges with devices connected to them respectively. The first channel and the third channel can uses the same or different communication protocols.

In at least one embodiment, CAM logic 106 receives a network identifier in connection with the first schedule. The network identifier can be common to one or more AP devices of wireless network 100. CAM logic 106, responsive to receiving a network identifier, can associate the network identifier with the second wireless device 104 and can include the network identifier in beacon frames, action frames, or the like. Once associated with the network identifier, CAM logic 106 can receive a first network identifier in connection with a first schedule received from first wireless device 102. The first network identifier can be associated with a group of one or more wireless devices that operate on a same channel or adjacent channels. CAM logic 106 can compare the first network identifier with a second network identifier stored at second wireless device 104. CAM logic 106 can store the first schedule at the second wireless device 104 responsive to the first network identifier and the second network identifier matching.

As described above, the third data can also include the same network identifier. CAM logic 106 can determine that the third network identifier matches a first network identifier associated with the first AP device and can update the second schedule to define the third periodic interval responsive to the first network identifier and the third network identifier matching. In some cases, the one or more periodic intervals, the second periodic interval, and the third periodic interval can all be non-overlapping periodic intervals.

In some embodiments, to minimize a device, especially a legacy (non-802.11ax) device, from taking over a medium during an AP's periodic interval, contention parameters can be adjusted to prioritize channel access to the AP during its periodic interval. Adjusting contention parameters during periodic intervals, allows some devices to have a higher priority and if these devices have data frame to be exchanged with the AP, they can do so without contention. In some cases, legacy devices that do not use the TWT feature and try to transmit in the periodic interval can disrupt a schedule if convention parameters are not adjusted. In at least one embodiment, CAM logic 106 sets a channel contention parameter to a first value at a beginning of the second periodic interval. At least one device, which is wirelessly connected to the first AP, such as endpoint device 108, transitions from a first state to a second state at the beginning of the second periodic interval. CAM logic 106 sends or receives one or more frames to or from the at least one device during the second periodic interval. CAM logic 106 sets the channel contention parameter to a second value at an end of the second periodic interval, the second value being greater than the first value.

In some embodiments, schedules of APs can be dynamically adjusted based on utilization values and corresponding threshold values being monitored by APs. For example, an AP can determine that it is using 65% of a periodic interval for frame exchanges. If a threshold value is set at 75% utilization, the AP can reduce a duration of the periodic interval in its schedule, freeing up additional bandwidth for other APs' schedules. Similarly, a utilization threshold value can be set for increasing a duration of the periodic interval. For example, an AP can determine that it is using 100% of a periodic interval for frame exchanges. If a threshold value is set to 95% utilization, the AP can increase a duration of the periodic interval in its schedule. This may be dependent on additional bandwidth being available among the APs' schedules. In one embodiment, CAM logic 106 receives third data from the third wireless device 138 (third AP), the third data including a third schedule that defines the one or more periodic intervals with at least one of the one or more periodic intervals having an amount of time that is reduced. That is, the third schedule can define a third amount of time for the first periodic interval and the third amount of time is greater than the first amount of time for the first periodic interval defined in the first schedule. In at least one embodiment, CAM logic 106 determines that a utilization value, indicative of a wireless device's use of the second periodic interval, is greater than a threshold value. In response to the utilization value being greater than the threshold value, CAM logic 106 generates a fourth schedule that define a fourth amount of time that is greater than a second amount of time defined for the second periodic interval in the second schedule. For example, a third schedule has a reduced duration for third periodic intervals, such as illustrated in FIG. 3.

Figure 3:
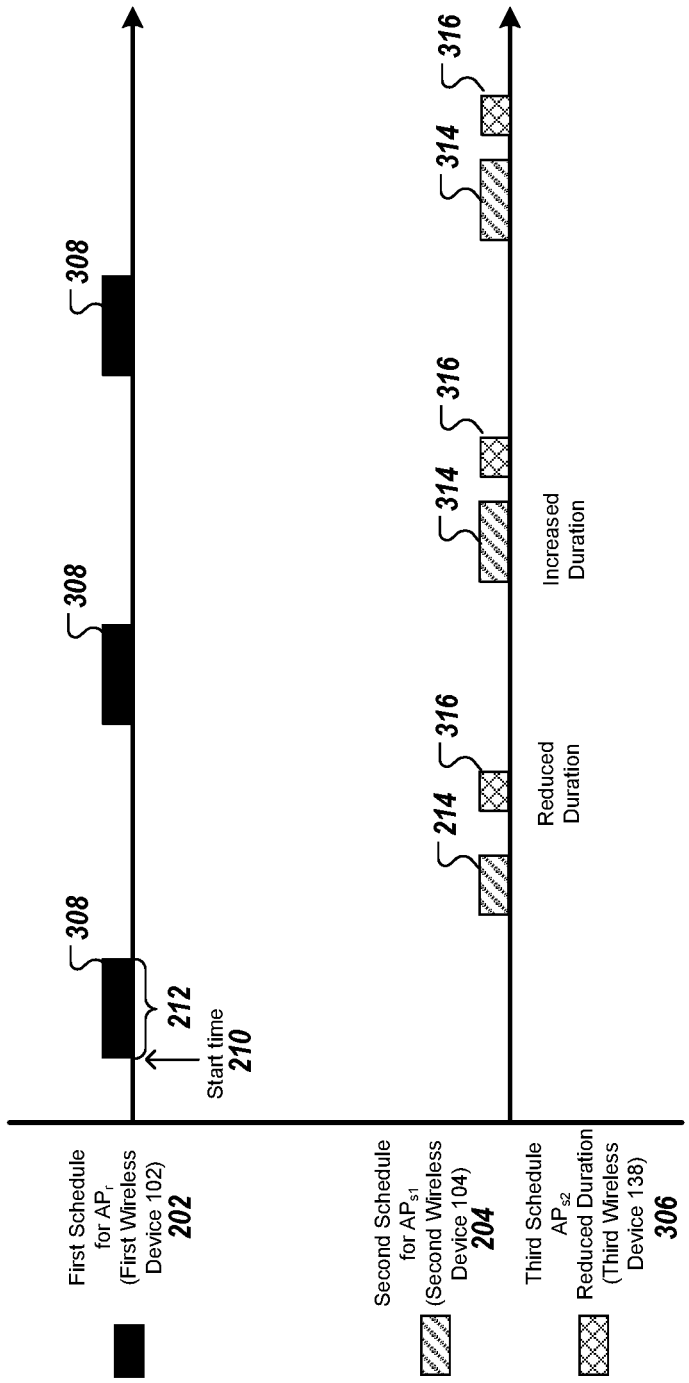
FIG. 3 illustrates a first schedule for a first wireless device, a second schedule for a second wireless device, and a third schedule with a reduced duration for a third wireless device, according to at least one embodiment.

FIG. 3 illustrates a first schedule 202 for a first wireless device 102, a modified second schedule 304 for a second wireless device 104, and a third schedule 306 with a reduced duration for a third wireless device 138, according to at least one embodiment. In at least one embodiment, CAM logic 106 receives an indication that third schedule 306 has a reduced duration from the third schedule 206 of FIG. 2. In another embodiment, CAM logic 136 of third wireless device 138 determines that a throughput demand value is less than a throughput value during the third periodic interval. For example, third wireless device 138 determines that a throughput demand is less than a throughput value during a previous interval and can decrease the third periodic interval, freeing up available bandwidth for other APs in wireless network 100. As a result, CAM logic 106 can determines that a current throughput value for traffic by second wireless device 104 is less than a current throughput demand value, meaning second wireless device 104 can send more data if there is available bandwidth. In response, CAM logic 106 can generate a new schedule, modified second schedule 304, with an increased duration for the second periodic intervals 314. CAM logic 106 can notify the other APs of the increased duration. In one embodiment, CAM logic 106 sends fourth data to the first AP and third AP, the fourth data including the fourth schedule. During subsequent second periodic intervals 314, an increased duration can be used by second wireless device 104 during frame exchanges. That is, CAM logic 106 communicates one or more data frames with one or more stations/devices according to the fourth schedule.

In another embodiment, CAM logic 106 of second wireless device 104 determines that a throughput demand value is less than a throughput value during the second periodic interval and generates a fourth schedule that defines the second periodic interval with an amount of time that is decreased from an amount of time in the second schedule. CAM logic sends fourth data to the first wireless device 102 and third wireless device 138, the fourth data including the fourth schedule with the reduced duration. As noted herein, the schedule, specified in data being received or transmitted, can be sent or received via a frame, such as a control frame, a beacon frame, an action frame, or the like. One example of a frame that defines a schedule of an AP is illustrated and described with respect to FIG. 4.

Figure 4:
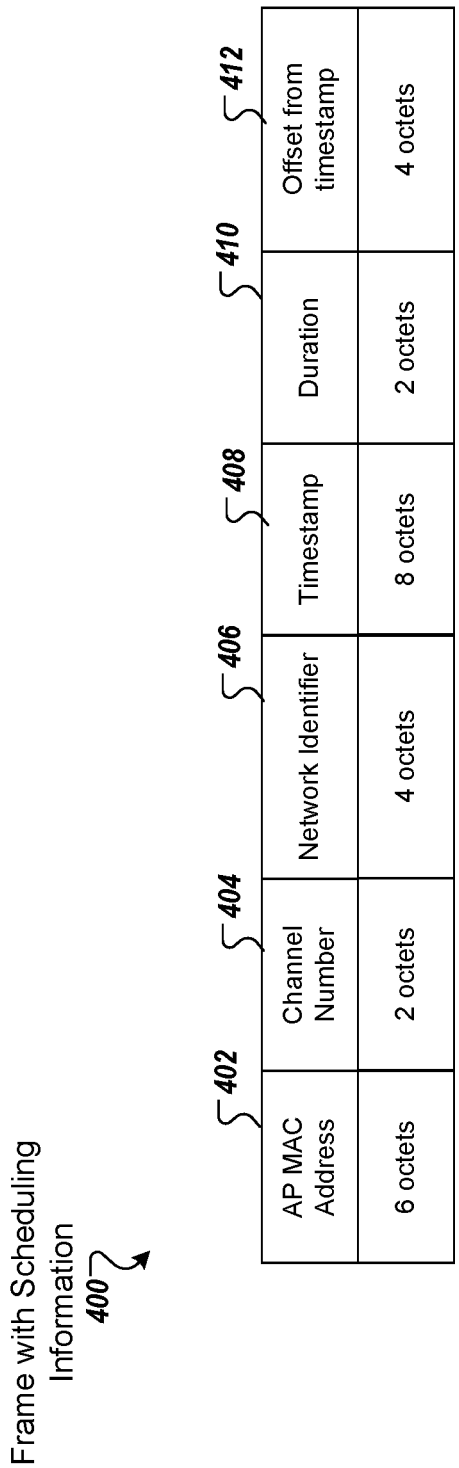
FIG. 4 is an example frame element that includes schedule information according to at least one embodiment.

FIG. 4 is an example frame element 400 that includes schedule information according to at least one embodiment. Example frame element 400 can include a media access control (MAC) address 402 of a respective AP, a channel number 404 indicating the first channel or an adjacent channel, a network identifier 406 that identifies a group of APs that use the first channel or the adjacent channel in a same wireless network, a timestamp 408, a duration 410, and an offset from timestamp 412. Offset from timestamp 412 can be an offset value indicative of a start time of an interval relative to timestamp 412. Duration 410 can include a time value that is indicative of an amount of time of the interval. FIG. 4 show some exemplary sizes of this data, such as 6 octets for MAC address 402, 2 octets for channel number 404, and so forth. Alternatively, other sizes of data can be used to convey scheduling information. In at least one embodiment, scheduling information, such as illustrated in FIG. 4, can be transmitted or received as an element of a frame, such as part of a vendor-specific element. In at least one embodiment, frame element 400 is exchanged among APs to distributed TWT timing information. For example, frame element 400 is carried in beacon frames in the AP and transmitted on a secondary control channel used by the APs to communicate with each other.

In at least one embodiment, CAM logic 106 can send a control frame to a station/device that is scheduled to transition from a first state to a second state at a beginning of the second periodic interval. The control frame includes information for sending or receiving data frames on the first channel or the second channel during the second periodic interval. For example, the control frame can be considered a trigger frame or an action frame that notifies the station/device that it can perform frame exchange during the second periodic interval. CAM logic 106 can cause second wireless device 104 to send or receive one or more data frames to or from the station/device on the first channel or the second channel during the second periodic interval after the control frame is sent.

Figure 5:
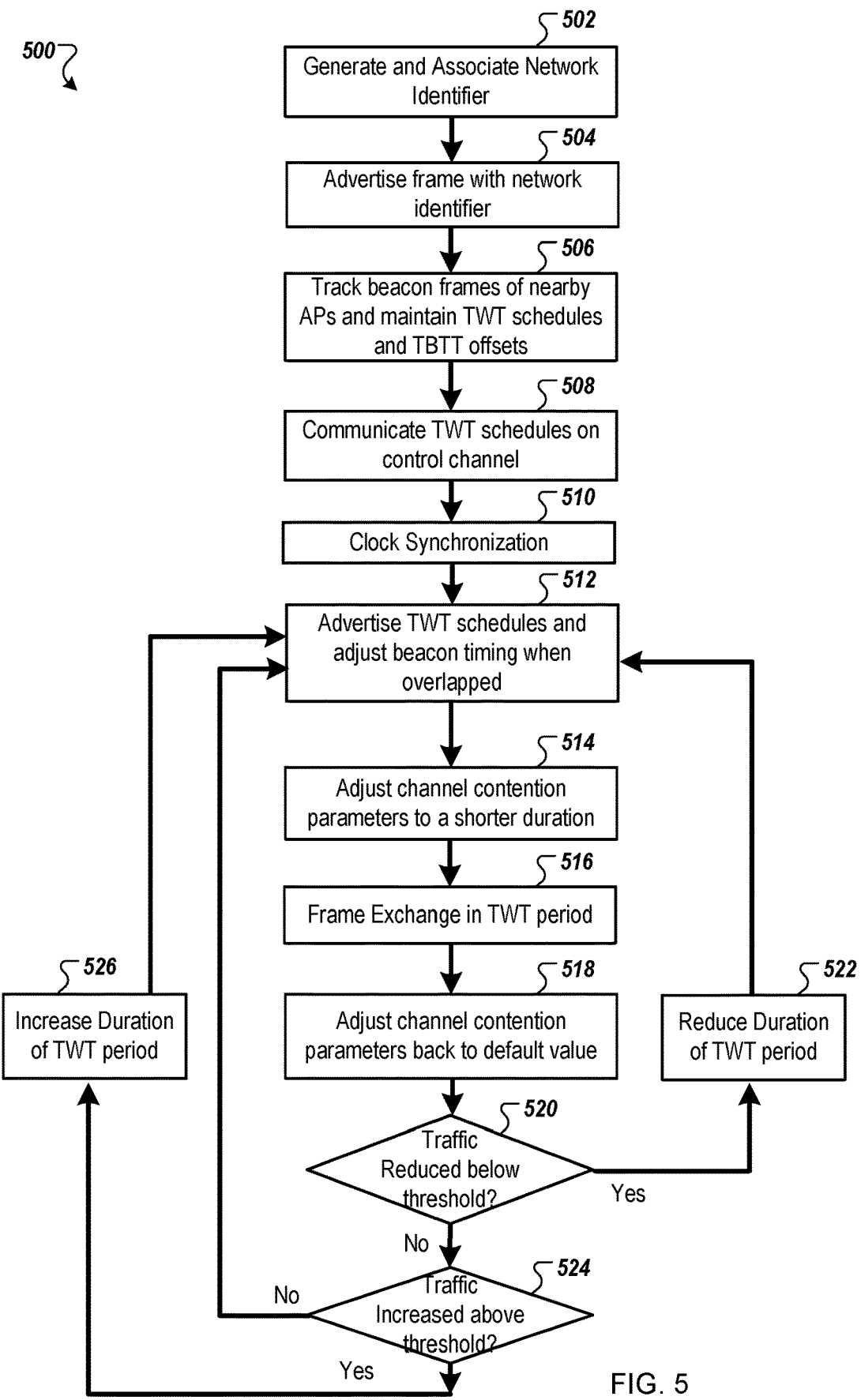
FIG. 5 is a flow diagram of an algorithm of distributing TWT schedules among three APs of a wireless mesh network according to one embodiment.

FIG. 5 is a flow diagram of an algorithm 500 of distributing TWT schedules among three APs of a wireless mesh network according to one embodiment. During network setup, a one-time network identifier (e.g., 32-bit identifier) is generated and associated with a set of APS that are part of the wireless mesh network and operating in a same interfering channel (block 502). A same interfering channel can be a same channel or adjacent channels. Network identifier can be advertised by an AP in a frame (block 504). For example, network identifier can be advertised as part of a vendor element in a beacon frame. In some embodiments, this network identifier does not change throughput a lifetime of the mesh wireless network for a given network channel on which devices are beaconing, unless an AP goes through a factory reset, which resets all configuration and state of the AP including the network identifier associated with it. An AP tracks beacon frames of nearby AP devices and maintains TWT schedule and the beacon frames' TBTT offsets from their local clocks (block 506). It should be noted that an AP can track TWT schedules of devices in a same network—APs having a same network identifier in their vendor elements of the beacon frames as the network identifier of the tracking AP. AN AP can also track TWT schedule of other networks or other channels, such as APs with different network identifiers in their vendor elements. For APs operating in an interfering channel, as noted by the common network identifier, that need contention protection, a control channel between these APs can be used to communication AP presence, along with associated beacon schedules, TWT schedules, timing information, as well as network identifiers (block 508). For these APs, clock synchronization is performed with clocks of other APs (block 510). This can be done by tracking beacon timestamps. A clock synchronization algorithm can be used. 4. These APs perform clock synchronization with other APs, passively by listening to Beacon Timestamp. Clock synchronization can be done to track the timings of other APs TWT schedules with respect to AP's own local clock. Once clock synchronization is achieved, these APs, adjust their beacon timings when there is an overlap and start advertising their TWT schedules to restrict other wireless devices in their BSSs (cell) to do channel access during these restricted TWT timings (block 512). In some cases, durations of TWT schedules need to be adjusted. Durations of TWT schedules can be adjusted as per an available bandwidth and expected aggregated throughput requirements. For example, an AP that gets aggregated traffic from other nodes typically may have TWT opportunities. This AP may also start with a longer duration in their TWT schedule initially. At a beginning of a TWT period of a TWT schedule, an AP adjusts their channel contention parameters (e.g., EDCA) to allow devices participating in TWT to maintain channel access (block 514). For example, EDCA parameter can be adjusted to a time value corresponding to Point Coordination Function Inter-frame space (PIFS). PIFS is less than a duration of Distributed Coordination Function Inter-frame space (DIFS), which is used to prevent collisions. As such, setting EDCA parameter to PIFS allows an AP has priority to access a channel over stations/devices. At an end of a TWT period of a TWT schedule, a contention beginning of a TWT period of a TWT schedule, an AP adjusts their channel contention parameters (e.g., EDCA) back to a previous default value, restoring a contention period to its default value (block 518).

In at least one embodiment, it is determined whether an amount of traffic in an AP's cell is reduced below a first threshold value (block 520). When an amount of traffic in an AP's cell is reduced below the first threshold value, an AP can reduce a duration of TWT periods (block 522). This allows bandwidth to be freed up for use by other AP, allowing other APs to extend their current TWT periods. An AP, after reducing the duration of TWT periods at block 522, advertises a revised TWT schedule at block 512. If it is determined that the amount of traffic in the AP's cell is not reduced below the first threshold value at block 520, the AP can determine whether the amount of traffic in AP's cell is increased above a second threshold value (block 524). When an amount of traffic in an AP's cell is increased above the second threshold value at block 524, an AP can increase a duration of TWT periods (block 526). This can be done when another AP has reduced their duration or there is still remaining bandwidth in the channel. This allows bandwidth to be used to handle the increased traffic by the AP. An AP, after increasing the duration of TWT periods at block 526, advertises a revised TWT schedule at block 512. TWT periods are dynamic and can change depending on the observed and expected (future) traffic exchanges. Once the TWT schedules are up, wireless devices perform channel access during their respective TWT windows, reducing the contention with other wireless devices that are not part of the same physical AP. When a wireless network is established, it may take some time for all the APs to converge on the optimal TWT schedules. In at least one embodiment, APs can save their TWT schedules on persistent backup, such as local storage (e.g., flash storage), or remote storage (e.g., cloud data storage) in order to recover this configuration upon reboot. In some embodiments, these TWT schedules along with traffic metrics can be reported to a cloud service and the cloud service can use the TWT schedules and traffic metrics to perform analytics on the cloud side and further tune the TWT schedules. The cloud service can then send the TWT schedules to the APs. In at least one embodiment, an amount of traffic of an AP's cell can be measured in terms of utilization of a TWT period. For example, the first threshold value can be set to 75% utilization, so that if a current utilization value, indicative of the amount of traffic, is less than 75%, the duration of the TWT period for the AP can be reduced at block 522. For another example, the second threshold value can be set to 95% utilization, so that if a current utilization value, is greater than 95%, the duration of the TWT period for the AP can be increased at block 526.

In some embodiments, an AP device is a multi-radio AP device. Multi-radio AP can be thought of as a special case of the above where radios operating in the same or adjacent channel can each run this algorithm to ensure these radios perform channel access on the non-overlapping TWT periods. An example of where TWT periods of two radios are staggered in a way to avoid overlap is illustrated in FIG. 6.

Figure 6:
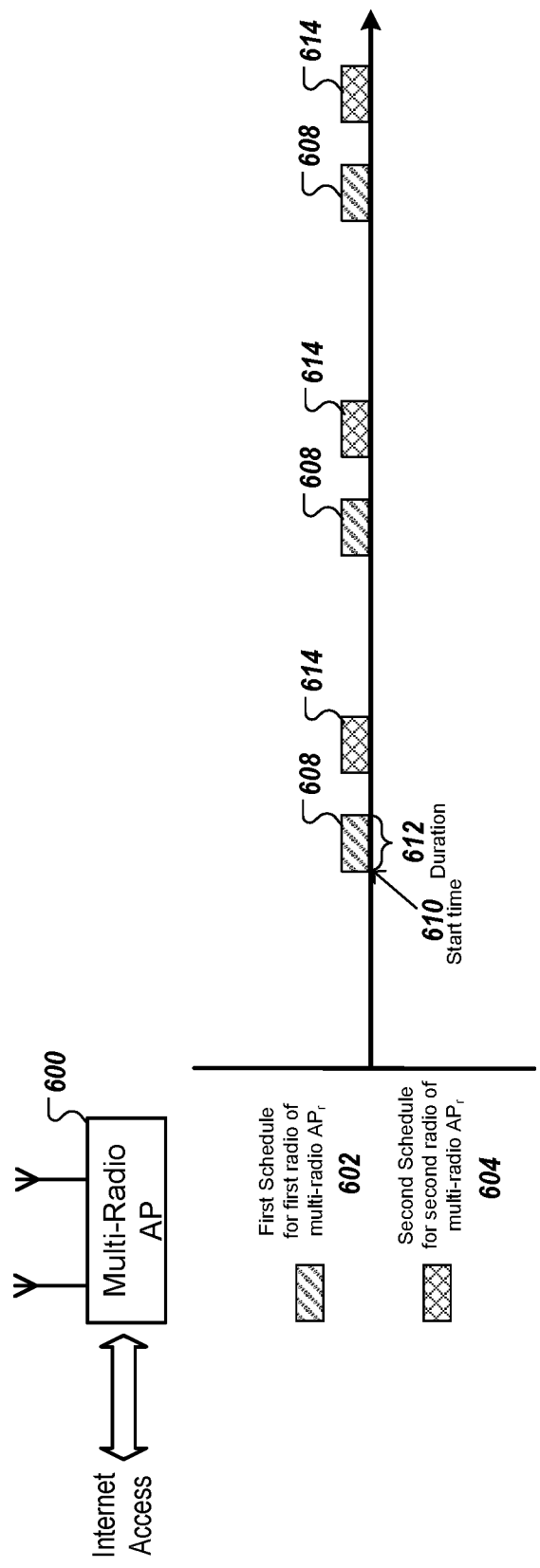
FIG. 6 illustrates a first schedule for a first radio of a multi-radio AP device and a second schedule for a second radio of the multi-radio AP device according to at least one embodiment.

FIG. 6 illustrates a first schedule 602 for a first radio of a multi-radio AP device 600 and a second schedule 604 for a second radio of the multi-radio AP device 600 according to at least one embodiment. First schedule 602 defines one or more periodic intervals 608 during which the first radio of the multi-radio AP device 600 transmits or receives frames on a first channel or a second channel that is adjacent to the first channel. Each of the one or more periodic intervals 608 includes a start time 610, such as noted by a timestamp and an offset number specified in a beacon frame. A beacon frame can also specify a duration 612 of the one or more periodic intervals 608. Alternatively, first schedule 602 can be included in an action frame transmitted by the first radio of the multi-radio AP device 600. In another embodiment, a start time and an end time can be specified in a beacon frame. Alternatively, first schedule 602 can be included in an action frame transmitted by the first radio of the multi-radio AP device 600.

Second schedule 604 defines one or more periodic intervals 614 during which the second radio of the multi-radio AP device 600 transmits or receives frames on the first or second channels. Each of the one or more periodic intervals 614 includes a start time, such as noted by a timestamp and an offset number specified in a beacon frame, as well as a duration. Alternatively, second schedule 604 can include time information in the beacon or action frames received or transmitted by the second radio of the multi-radio AP device 600. In some cases, second schedule 604 is generated to be non-overlapping with the first schedule 602 based on the first schedule 602. Alternatively, additional schedules can be considered when generating the second schedule 604. As illustrated in FIG. 6, given that APs' schedules do not overlap with each other, channel access contention is reduced as devices part of one AP BSS only perform frame exchange in the respective schedule, which do not overlap with other APs' schedules. When these multi-radios AP participate in a wireless mesh network, the sum of the TWT periods from both the radios are used to determine overlapping TWTs with neighboring APs combined TWT periods. In at least one embodiment, a network identifier associated with interfering channel is used to manage TWTs in that group of radios across different APs in the associated channel.

In at least one embodiment, a TWT schedule and corresponding TWT periods can be primarily driven by an AP cell's aggregate network load. However, there are cases when the TWT schedules need to change, such as described below with the following triggers, which when detected, can change TWT schedules. In at least one embodiment, an AP channel change can be a trigger that changes and propagates modified TWT schedules to other APs in the group. An AP channel change that does not cause contention, such as a change to a non-overlapping channel, may free-up available time in TWT schedules for the existing APs. Therefore, when APs in the same network fails to receive N consecutive TWT updates from the neighbor, an AP can assume that this TWT period of that AP is lost and may reclaim part of the lost TWT periods. N can be a predefined integer as a threshold for checking if a TWT period is lost. Alternatively, the TWT periods can be distributed evenly among participating APs. After a channel change, an AP may use a network identifier associated with a new channel to run a similar algorithm again to claim non-overlapping TWT periods. In at least one embodiment, an AP being turned off or rebooted can be a trigger that changes and propagates modified TWT schedule to other APs in the group. For example, when an AP in the same network fails to receive N consecutive TWT updates from the neighbor, an AP can reclaim part of the lost TWT periods. Once an AP determines that a TWT period of a neighbor AP is lost, an AP may do nothing and let other APs claim the TWT periods. Alternatively, once an AP determines that a TWT period of a neighbor AP is lost, an AP can determine that an AP cell's capacity is more than TWT utilization. That is, device in the cell have more traffic than the AP can serve in the existing TWT schedule. An AP can reclaim the lost TWT period or a portion of the lost TWT period, such as TWT period divided by M, where M is the number of APs with the same network identifier. Alternatively, other approaches can be used to reclaim or distribute TWT periods that have been given up, such as expected order of traffic, i.e., APs with more cell load receiving more of the TWT periods.

In at least one embodiment, a distributed algorithm to derive individual TWT schedules can be centralized and can reside locally in one of the APs or remotely, such as in a cloud service. APs with the same network identifier can communication with a central entity (one of the APs or the cloud service) to get updates of the TWT schedules. In at least one embodiment, a publish/subscribe model can be used for updates, where the centralized entity keeps publishing TWT schedules whenever there is a change for any of the APs with the same network identifier. A decision to modify a TWT schedule can be based on individual AP's BSS loads. APs track the TWT utilization and maintain a history and depending on near or under-utilization, a centralized entity may attempt to increase or reduce existing TWT periods.

Figure 7:
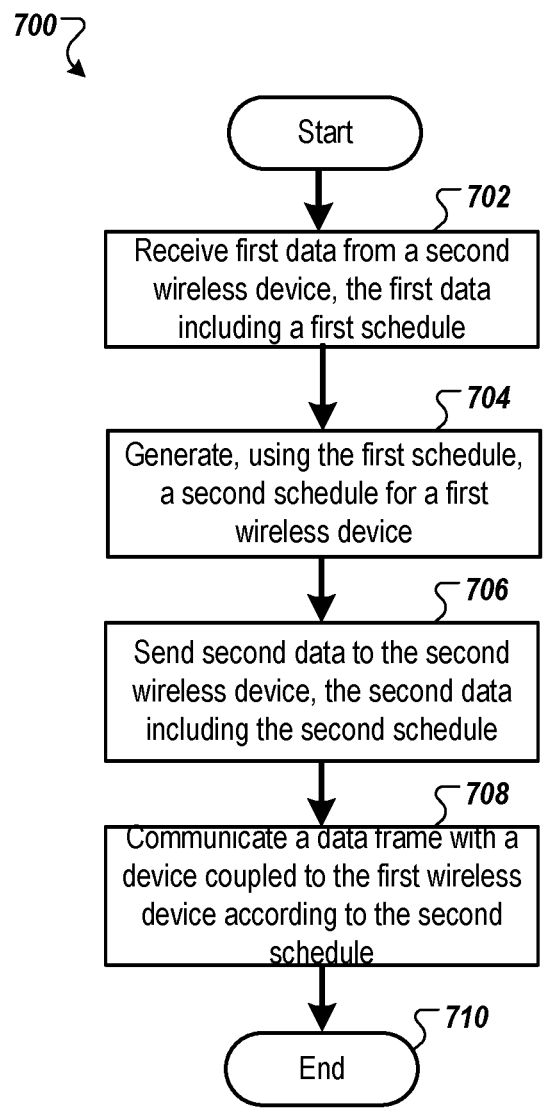
FIG. 7 is a flow diagram of a method of scheduling periodic intervals of multiple APs operating on a same channel or an adjacent channel according to at least one embodiment.

FIG. 7 is a flow diagram of a method 700 of scheduling periodic intervals of multiple APs operating on a same channel or an adjacent channel according to at least one embodiment. The method 700 may be performed by processing logic that comprises hardware (e.g., circuitry, dedicated logic, programmable logic, microcode, etc.), software, firmware, or a combination thereof. In one embodiment, the method 700 may be performed by CAM logic 106, 134, 136 of FIG. 1. In another embodiment, the method 700 is performed by any wireless device described herein.

Referring back to FIG. 7, the processing logic of a first wireless device begins by receiving first data from a second wireless device (block 702). The first wireless device and the second wireless device are part of a wireless network and both operating on a first channel or a second channel that is adjacent to the first channel. The first data includes a first schedule that defines one or more periodic intervals during which one or more wireless devices of the wireless network transmits or receives frames on the first channel or the second channel. Processing logic generates a second schedule that defines a second periodic interval during which the first wireless device transmits or receives frames on the first channel or the second channel, the second periodic interval and the one or more periodic intervals being non-overlapping periodic intervals (block 704). Processing logic sends second data to the one or more wireless devices, the second data including the second schedule (block 706). Processing logic communicates a data frame to a device coupled to the first wireless device according to the second schedule (block 708), and the method 700 ends.

In at least one embodiment, first data can include time information that can be used for synchronizing a first clock of the first wireless device with a clock of the one or more wireless devices. The first data can be communicated over a secondary control channel that is used by the wireless devices to communicate with one another. Information exchanged between wireless devices can use a network identifier for a group of wireless devices that are part of a same wireless network and operate on a same channel or an adjacent channel.

Although method 700 illustrates and describes a first schedule and a second schedule, in other embodiments, additional schedules can be received and used for generating a local schedule. For example, processing logic of the first wireless device can receive third data from a third wireless device, where the third data includes a third schedule that defines a third periodic interval with a third amount of time during which the third wireless device transmits or receives frames on the first channel or the second channel. The third data can also include a third network identifier. The processing logic determines that the third network identifier matches a first network identifier associated with the first wireless device and updates the second schedule to define the third periodic interval responsive to the first network identifier and the third network identifier matching. The one or more periodic intervals, the second periodic interval, and the third periodic interval are non-overlapping periodic intervals.

As described herein, in at least one embodiment, processing logic sets a channel contention parameter to a first value at a beginning of the second periodic interval. At least one device, which is wirelessly connected to the first wireless device, transitions from a first state to a second state at the beginning of the second periodic interval. Processing logic sends or receives one or more frames to or from the at least one device during the second periodic interval. Processing logic sets the channel contention parameter to a second value at an end of the second periodic interval, the second value being greater than the first value.

As described herein, in at least one embodiment processing logic can determine whether to change a schedule using a throughput demand value and a throughput value. In at least one embodiment, processing logic receives third data with a third schedule that defines the one or more periodic intervals with at least one of the one or more periodic intervals having a first amount of time that is reduced. Processing logic determines a throughput demand value is greater than a throughput value during the second periodic interval and generates a fourth schedule that defines the second periodic interval with a second amount of time that is increased. Processing logic sends fourth data to the second wireless device, the fourth data including the fourth schedule. Processing logic communicates one or more frames with one or more stations/devices according to the fourth schedule. In another embodiment, processing logic determines that a throughput demand value is less than a throughput value during the second periodic interval. Processing logic generates a fourth schedule that defines the second periodic interval with a second amount of time that is decreased. Processing logic sends fourth data with the fourth schedule to the second wireless device and communicates one or more frames with one or more stations/devices according to the fourth schedule.

When communicating with a station/device, processing logic sends a control frame to that station/device. The station/device transitions from a first state to a second state at a beginning of the second periodic interval and receives the control frame. The control frame includes information for sending or receiving data frames on the first channel or the second channel during the second periodic interval. Processing logic sends or receives one or more data frames to or from the station/device on the first channel or the second channel during the second periodic interval.

In one embodiment, the wireless devices can be AP devices. In another embodiment, the wireless devices can be mesh stations (STAs). Alternatively, other combination of wireless devices can be used.

Figure 8:
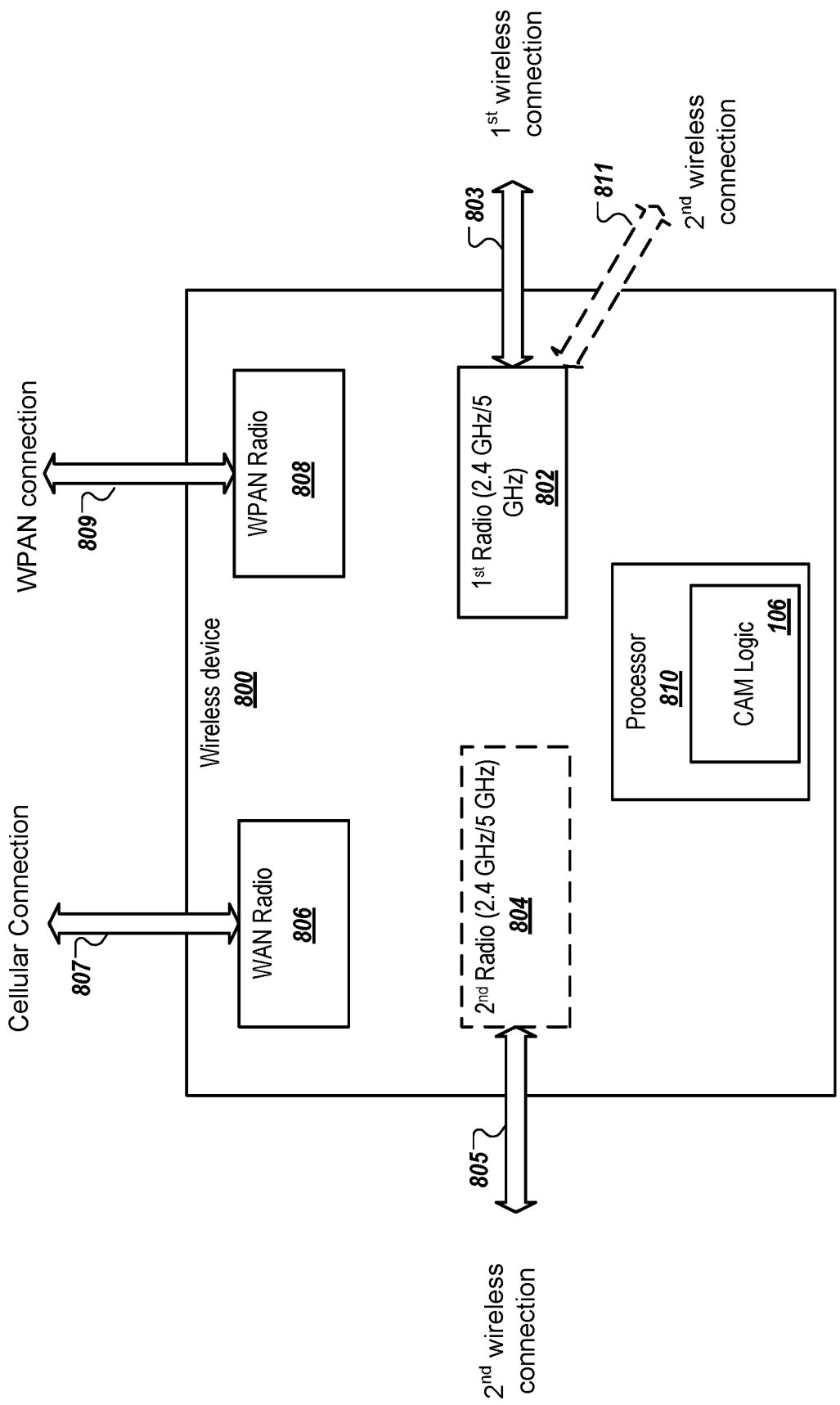
FIG. 8 is a block diagram of a wireless device with multiple radios according to one embodiment.

FIG. 8 is a block diagram of a wireless device 800 with multiple radios according to one embodiment. The wireless device 800 includes a first dual-band radio 802, a second dual-band radio 804, an optional cellular radio 806, an optional wireless personal area network (WPAN) radio 808, and a processor 810. The processor 810 can be any type of processing device that can implement operations associated with CAM logic 106, such as described above with respect to FIGS. 1-7. The first dual-band radio 802 creates a first wireless connection 803 between the wireless device 800 and a second wireless device, such as a router or a gateway in a first network. The second dual-band radio 804 creates a second wireless connection 805 between the wireless device 800 and an endpoint device in a second network. The second wireless connection 805 can be a peer-to-peer wireless connection or peer-to-multiple-peers wireless connections. The optional cellular radio 806 creates a cellular connection between the wireless device 800 and a device in a cellular network (not illustrated). The optional WPAN radio 808 can create a wireless connection between the wireless device 800 and a device in a WPAN. The WPAN radio 808 can be a radio that implements the Bluetooth® technology, ZigBee® technology, Zwave® technology, or the like.

In another embodiment, the wireless device 800 includes a single radio, such as the first radio that establishes the first wireless connection 803 between the wireless device 800 and a second wireless device, such as a router or a gateway in a first network. The same first radio establishes a second wireless connection 811 between the wireless device 800 and an endpoint device in a second network. The single radio can include an ability to create a soft AP using the same radio as being used for the first wireless connection 803. The CAM logic 106 can be implemented in a wireless device with a single radio.

During operation, the wireless device 800 can receive a request to playback a first content file. The request may originate from an application running on the processor 810. Alternatively, the wireless device 800 can request the content file on behalf of another client or endpoint device. The wireless device 800 sends a request for the first content file to the second wireless device through the first wireless connection 803 and receives the first content file in response. The wireless device 800 sends the content file, or portions of the content file, to the endpoint device over the second wireless connection 805. The endpoint device could be a speaker that receives audio data over the second wireless connection 805. The processor 810 can process the first content file and send video data to a connected display. Alternatively, the processor 810 can send the video over a wired or wireless connection to another device to be rendered on a display. In some embodiments, the wireless device 800 receives the first content file through one or more intervening devices between the wireless device and a content server of a content delivery network (CDN) or from a gateway of a home network.

In some embodiments, the wireless connections are WLAN connections that operate in a first frequency range (e.g., 2.4 GHz frequency band) or a second frequency range (e.g., any of the 5 GHz frequency bands).

In various embodiments, the wireless device 800 may include memory, storage, one or more wired communication interfaces, two or more wireless communication interfaces, one or more processing devices, or the like. The communication interface, which may include one or more network devices for connecting to the Internet, may be adapted to also wirelessly couple the wireless device 800 to one or more network devices of a first network (e.g., a first AP). The processor 810 can process various data including, for example, topology information, such as node location, historical interference event data (e.g., which devices detected interference events on which channels), historical data transfer rate requirements (e.g., from applications on the client wireless devices), historical application-based throughput and latency requirements (e.g., by content streaming applications of the client wireless devices over particular channels), per-channel antenna configurations, and channel congestion data associated with particular channels on which the multiple wireless devices communicate. The data may further include information associated with, or useable to determine, pattern recognition and learning associated with radar event detection, data bandwidth requirements, and latency requirements, and the like. The data may also include scan lists, proximity data, dynamic frequency selection (DFS) channels, requirement sets, or the like as described above with respect to FIG. 1-7.

In embodiments, the wireless device 800 includes a memory device that stores data, which are related to channels of the wireless devices and associated with topology information, channel congestion data, historical interference event data, historical application-based requirements information (e.g., historical application-based throughput and latency requirements), and per-channel antenna configurations. The memory device can also store data to be used for the CAM logic 106, including the DFS channels, as well as fallback channels of the DFS channels. The wireless device 800 can communicate with other devices on a network. The network may be representative of an Internet or WAN connection. Such an Internet or WAN connection may include additional links or trunks, whether wired or wireless, that may involve other types of wideband communication, including those based on cellular standard(s).

In various embodiments, the processor 801 can include one or more modules, such as a coverage map manager, a registration manager, a radar event manager, CAM module, or the like. The coverage map data manager can collect information from the devices for purposes of generating and maintain coverage map data for the wireless device 800. The registration manager can handle registration requests by endpoint device(s) that are interested in event notifications.

In at least one embodiment, wireless device 800 is a wireless access point (WAP) device, including a WLAN radio and a processor, such as processor 801. Processor 801 is configured to receive first data from a second WAP device. The WAP device and the second WAP device are part of a wireless network and both operate on a first channel or a second channel that is adjacent to the first channel. The first data can include a first schedule that defines a first periodic interval during which the second WAP device transmits or receives frames on the first channel or the second channel. Processor 801 generates a second schedule that defines a second periodic interval during which the WAP device transmits or receives frames on the first channel or the second channel, the second periodic interval and the first periodic interval being non-overlapping periodic intervals. Processor 801 sends second data with the second schedule to the second WAP device. Processor 801 communicates one or more data frames to one or more stations/devices according to the second schedule. In at least one embodiment, wireless device 800 is a mesh station (STA) device, including a WLAN radio and a processor, such as processor 801. Processor 801 is configured to receive first data from a second mesh STA device. The mesh STA device and the second mesh STA device are part of a wireless network and both operate on a first channel or a second channel that is adjacent to the first channel. The first data can include a first schedule that defines a first periodic interval during which the second mesh STA device transmits or receives frames on the first channel or the second channel. Processor 801 generates a second schedule that defines a second periodic interval during which the mesh STA mesh STA device transmits or receives frames on the first channel or the second channel, the second periodic interval and the first periodic interval being non-overlapping periodic intervals. Processor 801 sends second data with the second schedule to the second WAP device. Processor 801 communicates one or more data frames to one or more stations/devices according to the second schedule.

In some embodiments, the first data received by the WAP device includes time information and processor 801 uses the time information to synchronize a first clock of the WAP device with a clock of the second WAP device. The first data and the second data can be shared by the WAP device and the second WAP device over a secondary communication channel, such as a control channel. This secondary communication channel is different from the first or second channels. In some embodiments, the first data includes a network identifier associated with the second WAP device and processor 801 associates the network identifier with the WAP device.

In another embodiment, processor 801 receives third data from a third AP device. The third data can include a third schedule, a third network identifier, and time information. The third schedule defines a third periodic interval with a third amount of time during which the third AP device transmits or receives frames on the first channel or the second channel. Processor 801 determines that the third network identifier matches a first network identifier associated with the WAP device and updates the second schedule to define the third periodic interval responsive to the first network identifier and the third network identifier matching. In this case, the first periodic interval, the second periodic interval, and the third periodic interval are non-overlapping periodic intervals. In another embodiment, processor 801 receives third data from the second WAP device, the third data with a third schedule that defines the first periodic interval as having a first amount of time that is reduced from an amount of time in the first schedule. Processor 801 determines that a throughput demand value is greater than a throughput value during the second periodic interval and generates a fourth schedule that defines the second periodic interval with a second amount of time that is increased. Processor 801 sends fourth data with the fourth schedule to the second WAP device. In another embodiment, processor 801 determines that a throughput demand value is less than a throughput value during the second periodic interval and generates a fourth schedule that defines the second periodic interval with a second amount of time that is decreased. Processor 801 sends fourth data with the fourth schedule to the second WAP device.

In some embodiment, processor 801 sets set a channel contention parameter to a first value at a beginning of the second periodic interval. At least one device, which is wirelessly connected to the WAP device, transitions from a first state to a second state at the beginning of the second periodic interval. Processor 801 sends a control frame to a station/device. The control frame includes information for sending or receiving data frames on the first channel or the second channel during the second periodic interval. Processor 801 sends one or more frames to the station/device on the first channel or the second channel during the second periodic interval and sets the channel contention parameter to a second value at an end of the second periodic interval. The second value is greater than the first value so that the first value allows WAP device channel access over other devices.

Figure 9:
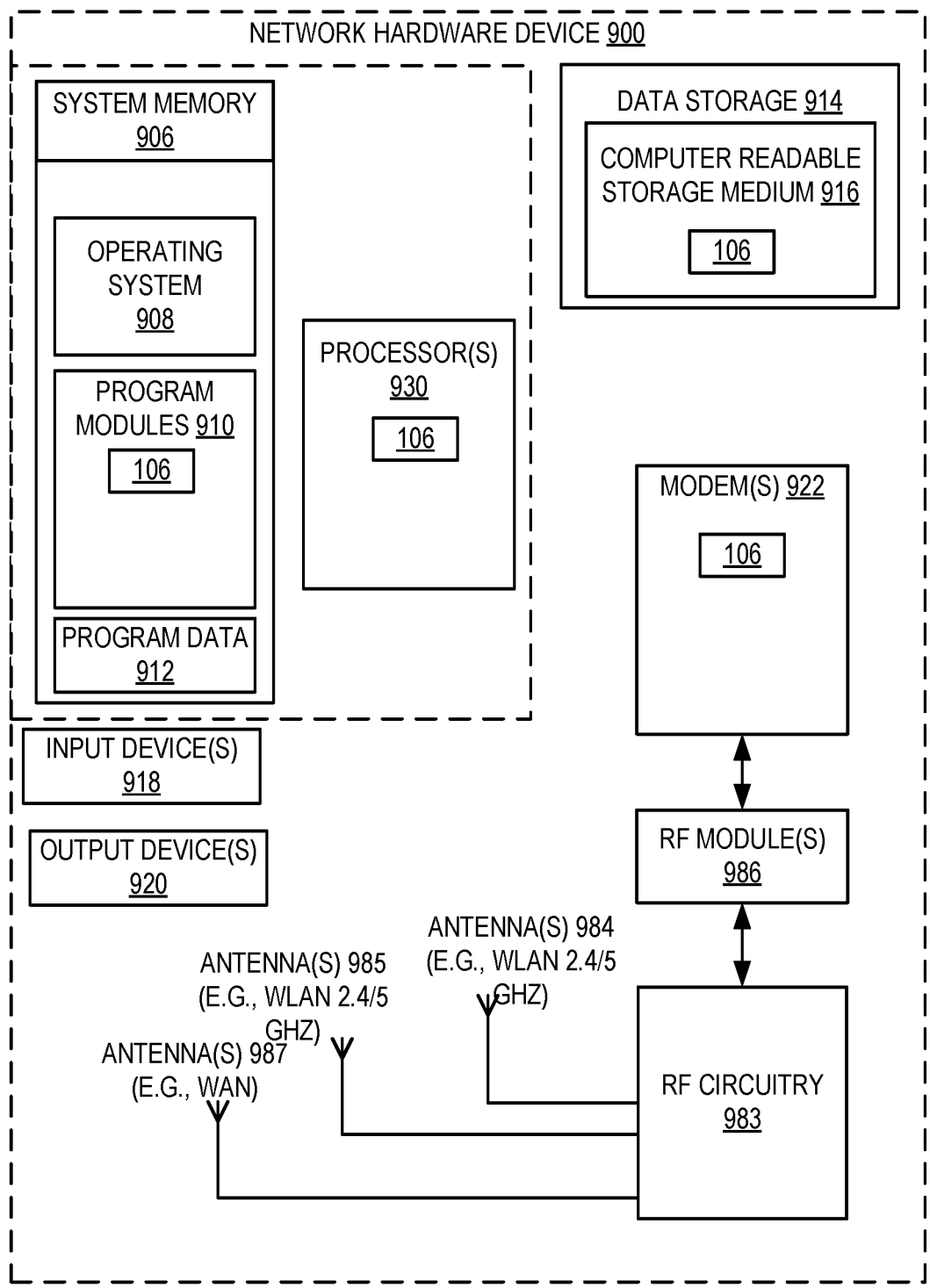
FIG. 9 is a block diagram of a wireless device for reducing medium access contention in a wireless network according to one embodiment.

FIG. 9 is a block diagram of a wireless device 900 for reducing medium access contention in a wireless network according to one embodiment. The wireless device 900 may correspond to the mesh network devices described above with respect to FIGS. 1-8. Alternatively, the wireless device 900 may be other electronic devices, as described herein.

The wireless device 900 includes one or more processor(s) 930, such as one or more CPUs, microcontrollers, field programmable gate arrays, or other types of processors. The wireless device 900 also includes system memory 906, which may correspond to any combination of volatile and/or non-volatile storage mechanisms. The system memory 906 stores information that provides operating system component 908, various program modules 910, program data 912, and/or other components. In one embodiment, the system memory 906 stores instructions of methods to control operation of the wireless device 900. The wireless device 900 performs functions by using the processor(s) 930 to execute instructions provided by the system memory 906. In one embodiment, the program modules 910 may include CAM logic 106. The CAM logic 106 may perform some of the operations of reducing medium access contention descried herein.

The wireless device 900 also includes a data storage device 914 that may be composed of one or more types of removable storage and/or one or more types of non-removable storage. The data storage device 914 includes a computer-readable storage medium 916 on which is stored one or more sets of instructions embodying any of the methodologies or functions described herein. Instructions for the program modules 910 (e.g., CAM logic 106) may reside, completely or at least partially, within the computer-readable storage medium 916, system memory 906 and/or within the processor(s) 930 during execution thereof by the wireless device 900, the system memory 906 and the processor(s) 930 also constituting computer-readable media. The wireless device 900 may also include one or more input devices 918 (keyboard, mouse device, specialized selection keys, etc.) and one or more output devices 920 (displays, printers, audio output mechanisms, etc.).

The wireless device 900 further includes a modem 922 to allow the wireless device 900 to communicate via a wireless connections (e.g., such as provided by the wireless communication system) with other computing devices, such as remote computers, an item providing system, and so forth. The modem 922 can be connected to one or more radio frequency (RF) modules 986. The RF modules 986 may be a WLAN module, a WAN module, PAN module, GPS module, or the like. The antenna structures (antenna(s) 984, 985, 987) are coupled to the RF circuitry 983, which is coupled to the modem 922. The RF circuitry 983 may include radio front-end circuitry, antenna switching circuitry, impedance matching circuitry, or the like. The antennas 984 may be GPS antennas, NFC antennas, other WAN antennas, WLAN or PAN antennas, or the like. The modem 922 allows the wireless device 900 to handle both voice and non-voice communications (such as communications for text messages, multimedia messages, media downloads, web browsing, etc.) with a wireless communication system. The modem 922 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 922 may generate signals and send these signals to antenna(s) 984 of a first type (e.g., WLAN 5 GHz), antenna(s) 985 of a second type (e.g., WLAN 2.4 GHz), and/or antenna(s) 987 of a third type (e.g., WAN), via RF circuitry 983, and RF module(s) 986 as descried herein. Antennas 984, 985, 987 may be configured to transmit in different frequency bands and/or using different wireless communication protocols. The antennas 984, 985, 987 may be directional, omnidirectional, or non-directional antennas. In addition to sending data, antennas 984, 985, 987 may also receive data, which is sent to appropriate RF modules connected to the antennas. One of the antennas 984, 985, 987 may be any combination of the antenna structures described herein.

In one embodiment, the wireless device 900 establishes a first connection using a first wireless communication protocol, and a second connection using a different wireless communication protocol. The first wireless connection and second wireless connection may be active concurrently, for example, if a wireless device is receiving a media item from another wireless device (e.g., a mini-POP node) via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 922 is shown to control transmission and reception via antenna (984, 985, 987), the wireless device 900 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A first wireless device comprising:
   a first wireless local area network (WLAN) radio;
   a second WLAN radio; and
   a processor coupled to the first WLAN radio and the second WLAN radio, wherein the processor:
      establishes a first wireless connection with a second wireless device using the first WLAN radio, the second wireless device operating as a first access point (AP) on a first channel and providing Internet access;
      after the first wireless connection is established, the processor further:
         i) enables, using the second WLAN radio, a second AP on the first channel, or a second channel adjacent to the first channel;
         ii) receives first data from the second wireless device, the first data comprising a) a first schedule that defines a first periodic interval during which the second wireless device transmits or receives frames on the first channel to or from a first set of one or more client devices connected to the second wireless device and b) a timestamp indicative of a first clock at the second wireless device;
         iii) synchronizes a second clock of the first wireless device with the first clock using the timestamp;
         iv) generates, using the first schedule, a second schedule that defines a second periodic interval during which the first wireless device transmits or receives frames on the first channel or the second channel to or from a second set of one or more client devices connected to the first wireless device, the second periodic interval and the first periodic interval are non-overlapping periodic intervals;
         v) sends second data to the second wireless device, the second data comprising the second schedule; and
         vi) communicates a data frame with a device coupled to the first wireless device, according to the second schedule.

2. The first wireless device of claim 1, wherein the first data further comprises c) a network identifier associated with a set of AP devices that are part of a wireless mesh network and operating on the first channel or the second channel, the set of AP devices comprising at least the second wireless device, the first wireless device, and a third wireless device, wherein the processor further:
   vii) receives third data from a third wireless device operating as a third AP, the third data comprising a) a third schedule that defines a third periodic interval during which the third wireless device transmits or receives frames on the first channel or the second channel and b) a timestamp indicative of a third clock at the third AP;
   viii) generates the second schedule using the first schedule and the third schedule, the third periodic interval, the second periodic interval, and the first periodic interval being non-overlapping periodic intervals;
   ix) sends the second schedule to the third wireless device, wherein at least one device, which is wirelessly connected to the first wireless device, transitions from an idle state to an active state at a beginning of the second periodic interval;
   x) adjusts a channel contention parameter to a first value at the beginning of the second periodic interval, the channel contention parameter being set to the first value prevents another device from taking over the first channel during the second periodic interval;
   xi) sends or receives frames to or from the at least one device during the second periodic interval; and
   xii) adjusts the channel contention parameter to a second value at an end of the second periodic interval, the second value being greater than the first value.

3. The first wireless device of claim 1, wherein the processor further:
   vii) receives third data from the second wireless device, the third data comprising a) a third schedule that defines the first periodic interval with a third amount of time that is less than a first amount of time for the first periodic interval defined in the first schedule;
   viii) determines that a utilization value, indicative of the first wireless device's use of the second periodic interval, is greater than a threshold value;
   ix) generates a fourth schedule that defines the second periodic interval with a fourth amount of time that is greater than a second amount of time for the second periodic interval defined in the second schedule, responsive to the utilization value being greater than the threshold value;
   x) sends fourth data to the second wireless device, the fourth data comprising the fourth schedule; and
   xi) communicates a data frame with the device connected to the first wireless device according to the fourth schedule.

4. A method comprising:
   receiving, by a first wireless device, first data from a second wireless device, the first wireless device and the second wireless device being part of a wireless network and both operating on a first channel or a second channel that is adjacent to the first channel, wherein the first data comprises a first schedule that defines a first interval during which the second wireless device transmits or receives frames on the first channel or the second channel to or from a first set of one or more client devices connected to the second wireless device;
   generating, by the first wireless device, a second schedule that defines a second interval during which the first wireless device transmits or receives frames on the first channel or the second channel to or from a second set of one or more client devices connected to the first wireless device, the second interval being non-overlapping with the first interval;
   sending, by the first wireless device, second data to the second wireless device, the second data comprising the second schedule; and
   communicating, by the first wireless device, a data frame with a device coupled to the first wireless device according to the second schedule.

5. The method of claim 4, wherein the first data further comprises time information, and wherein the method further comprises synchronizing, using the time information, a first clock of the first wireless device with a clock of the second wireless device.

6. The method of claim 4, wherein the receiving the first data and the sending the second data are performed on a third channel that is different from the first channel or the second channel.

7. The method of claim 4, wherein the first data comprises a first network identifier associated with a group of one or more wireless devices of the wireless network that operate on the first channel or the second channel, and wherein the method further comprises:
  comparing the first network identifier with a second network identifier stored at at the first wireless device;
  associating the first network identifier with first wireless device; and
  storing the first schedule responsive to the first network identifier and the second network identifier matching.

8. The method of claim 4, further comprising:
  receiving, by the first wireless device, third data from a third wireless device, the third data comprising a) a third schedule that defines a third interval during which the third wireless device transmits or receives frames on the first channel or the second channel and b) a third network identifier associated with the third wireless device;
  determining, by the first wireless device, that the third network identifier matches a first network identifier associated with the first wireless device; and
  updating the second schedule to define the third interval responsive to the first network identifier and the third network identifier matching, wherein the first interval, the second interval, and the third interval are non-overlapping intervals.

9. The method of claim 4, further comprising:
  setting, by the first wireless device, a channel contention parameter to a first value at a beginning of the second interval, wherein at least one device, which is wirelessly connected to the first wireless device, transitions from a first state to a second state at the beginning of the second interval;
  sending or receiving, by the first wireless device, one or more frames to or from the at least one device during the second interval; and
  setting, by the first wireless device, the channel contention parameter to a second value at an end of the second interval, the second value being greater than the first value.

10. The method of claim 4, further comprising:
  receiving, by the first wireless device, third data from the second wireless device, the third data comprising a third schedule that defines the first interval as having a third amount of time that is less than a first amount of time previously defined for the first interval in the first schedule;
  determining, by the first wireless device, that a utilization value is greater than a threshold value;
  generating, by the first wireless device, a fourth schedule that defines the second interval as having a fourth amount of time that is greater than a second amount of time previously defined for the second interval in the second schedule; and
  sending, by the first wireless device, the fourth schedule to the second wireless device.

11. The method of claim 4, further comprising:
  determining, by the first wireless device, that a utilization value is less than a threshold value;
  generating, by the first wireless device, a fourth schedule that defines the second interval as having a fourth amount of time that is less than a second amount of time previously defined for the second interval in the second schedule; and
  sending, by the first wireless device to the second wireless device, the fourth schedule.

12. The method of claim 4, wherein the first data comprises a network identifier associated with the second wireless device, a channel number corresponding to the first channel or the second channel being used by the second wireless device, a timestamp, a value indicative of a start time of the first interval relative to the timestamp, a time value indicative of a duration of the first interval.

13. The method of claim 4, further comprising:
  sending, by the first wireless device, a control frame to a device that transitions from a first state to a second state at a beginning of the second interval, the control frame comprising information for sending or receiving data frames on the first channel or the second channel during the second interval, wherein the device is communicatively coupled to the first wireless device; and
  sending or receiving, by the first wireless device, one or more data frames to or from the device on the first channel or the second channel during the second interval.

14. A first wireless device comprising:
  a wireless local area network (WLAN) radio;
  a processor coupled to the WLAN radio, wherein the processor is configured to:
    receive first data from a second wireless device, the first wireless device and the second wireless device being part of a wireless network and both operating on a first channel or a second channel that is adjacent to the first channel, wherein the first data comprises a first schedule that defines a first interval during which the second wireless device transmits or receives frames on the first channel or the second channel to or from a first set of one or more client devices connected to the second wireless device;
    generate a second schedule that defines a second interval during which the first wireless device transmits or receives frames on the first channel or the second channel to or from a second set of one or more client devices connected to the first wireless device, the second interval and the first interval being non-overlapping intervals;
    send second data to the second wireless device, the second data comprising the second schedule; and
    communicate a data frame to a device coupled to the first wireless device according to the second schedule.

15. The first wireless device of claim 14, wherein the first data further comprises time information, and wherein the processor is further configured to synchronize, using the time information, a first clock of the first wireless device with a clock of the second wireless device.

16. The first wireless device of claim 14, wherein the processor is to receive the first data and send the second data on a third channel that is different from the first channel or the second channel.

17. The first wireless device of claim 14, wherein the first wireless device is at least one of an access point (AP) device or a mesh station.

18. The first wireless device of claim 14, wherein the processor is further configured to:
  receive third data from a third wireless device, the third data comprising a) a third schedule that defines a third interval with a third amount of time during which the third wireless device transmits or receives frames on the first channel or the second channel and b) a third network identifier associated with the third wireless device;

determine that the third network identifier matches a first network identifier associated with the first wireless device; and update the second schedule to define the third interval responsive to the first network identifier and the third network identifier matching, wherein the first interval, the second interval, and the third interval are non-overlapping intervals.

19. The first wireless device of claim 14, wherein the processor is further configured to:

set a channel contention parameter to a first value at a beginning of the second interval, wherein at least one device, which is wirelessly connected to the first wireless device, transitions from a first state to a second state at the beginning of the second interval;

send a control frame to a station, the control frame comprising information for sending or receiving data frames on the first channel or the second channel during the second interval;

send one or more frames to the station on the first channel or the second channel during the second interval; and set the channel contention parameter to a second value at an end of the second interval, the second value being greater than the first value.

20. The first wireless device of claim 14, wherein the processor is further configured to:

receive third data from the second wireless device, the third data comprising a) a third schedule that defines the first interval as having a third amount of time that is reduced from a first amount of time in the first schedule;

determine that a utilization value is greater than a threshold value;

generate a fourth schedule that defines the second interval with a fourth amount of time that is increased from a second amount of time in the second schedule; and send the fourth schedule to the second wireless device.

* * * * *